(12) United States Patent
Huang

(10) Patent No.: US 7,520,782 B1
(45) Date of Patent: Apr. 21, 2009

(54) ENHANCED DATA TRANSMISSION AND CHARGER CABLE FOR COMPUTING DEVICES IN INTERACTION WITH MULTIPLE POTENTIAL POWER SOURCES

(75) Inventor: George Huang, Los Altos Hills, CA (US)

(73) Assignee: Future Dial, Inc., Sunnyvale, CA (US)

( * ) Notice: Subject to any disclaimer, the term of this patent is extended or adjusted under 35 U.S.C. 154(b) by 0 days.

(21) Appl. No.: 11/472,093

(22) Filed: Jun. 20, 2006

Related U.S. Application Data

(60) Provisional application No. 60/692,405, filed on Jun. 20, 2005.

(51) Int. Cl.
*H01R 25/00* (2006.01)

(52) U.S. Cl. .................. 439/638; 439/516; 439/660
(58) Field of Classification Search ............. 439/76.1, 439/502, 518, 638, 660
See application file for complete search history.

(56) References Cited

U.S. PATENT DOCUMENTS

| | | | | |
|---|---|---|---|---|
| 5,592,118 | A * | 1/1997 | Wilmot et al. | 327/440 |
| 5,884,086 | A * | 3/1999 | Amoni et al. | 713/300 |
| 6,334,793 | B1 * | 1/2002 | Amoni et al. | 439/680 |
| 6,991,483 | B1 * | 1/2006 | Milan et al. | 439/171 |
| 2003/0052547 | A1 * | 3/2003 | Fischer et al. | 307/154 |
| 2003/0148663 | A1 * | 8/2003 | Hsin | 439/638 |
| 2004/0008012 | A1 * | 1/2004 | Hsu | 323/266 |
| 2004/0038592 | A1 * | 2/2004 | Yang | 439/638 |
| 2005/0070154 | A1 * | 3/2005 | Milan | 439/502 |

\* cited by examiner

*Primary Examiner*—James Harvey
(74) *Attorney, Agent, or Firm*—Greenberg Traurig, LLP

(57) ABSTRACT

One embodiment as described herein provides enhanced data transmission and charger cable assembly for computing devices in interaction with multiple potential power sources. In one embodiment, a cable assembly is provided having a universal adaptor at a first end of the assembly to connect with any one of a plurality of computing device connectors, each computing device connector corresponding to a separate computing device, and a second adapter at a second end of the assembly, the second adapter having a power regulation and data transmission, the cable to provide power and data to the computing devices via the universal adaptor.

25 Claims, 4 Drawing Sheets

ENHANCED DATA TRANSMISSION AND CHARGER CABLE FOR COMPUTING DEVICES IN INTERACTION WITH MULTIPLE POTENTIAL POWER SOURCES

RELATED APPLICATIONS

Under 35 U.S.C. 119(e), this application claims the benefit of priority to U.S. Provisional Application No. 60/692,405, filed Jun. 20, 2005.

BACKGROUND

In the last few years the number of cell phones has multiplied, and the number of other electronic devices has also grown. A major issue in the field of cell phone technology is the ability of a phone to maintain full connectivity while recharging its power from some other electronic device, such as a notebook or desktop computers, a car or airplane power source, etc.

What is clearly needed is a system and method for an enhanced universal cable that can meet all the requirements for data connectivity while recharging from any of a variety of available power sources, while offering the minimum space and weight possible, and with the highest flexibility and degree of future proofing possible.

SUMMARY

One embodiment as described herein provides enhanced data transmission and charger cable assembly for computing devices in interaction with multiple potential power sources. In one embodiment, a cable assembly is provided having a universal adaptor at a first end of the assembly to connect with any one of a plurality of computing device connectors, each computing device connector corresponding to a separate computing device, and a second adapter at a second end of the assembly, the second adapter having a power regulation and data transmission, the cable to provide power and data to the computing devices via the universal adaptor.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
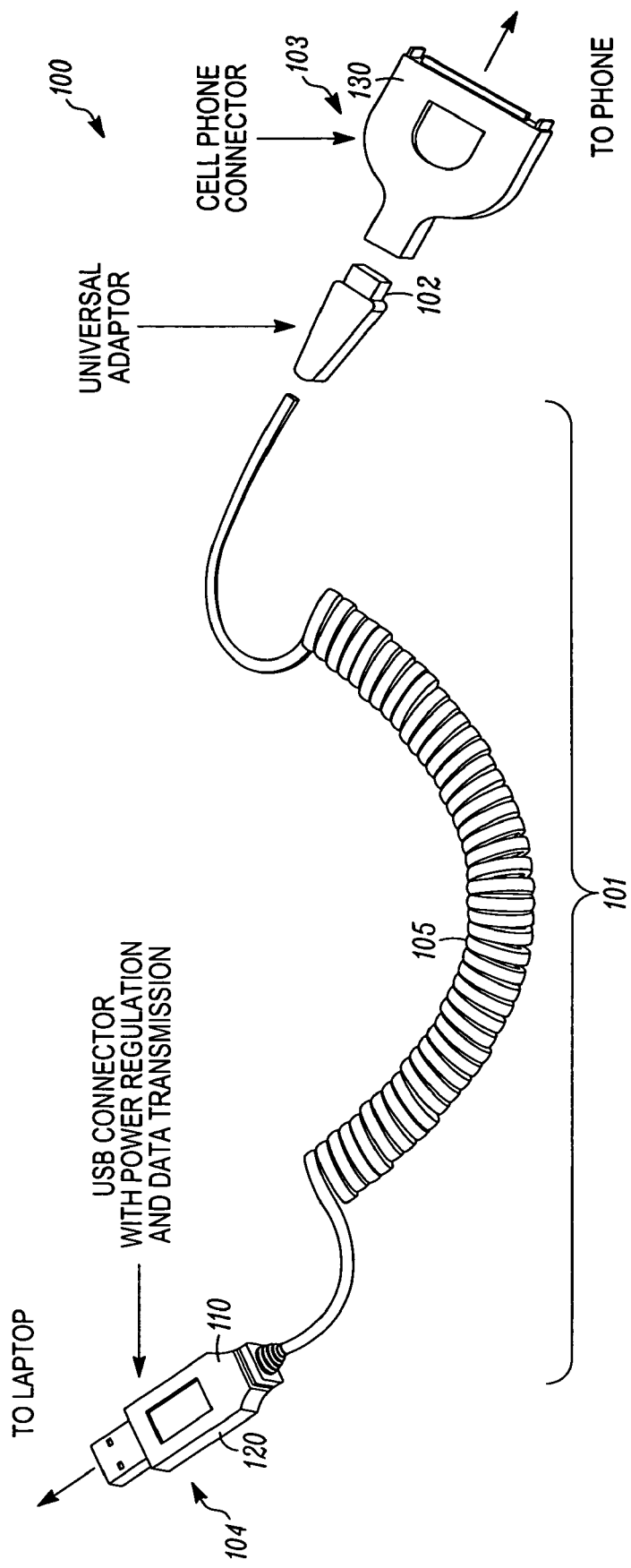
FIG. 1 shows an overview of the a cable assembly 100 according to one embodiment.

FIG. 1 shows an overview of a cable assembly 100 according to one embodiment. Cable 100 has a USB connector 104 that typically would plug into a notebook or laptop computer (not shown). Connector 104 may contain a voltage regulator and data transmission unit 120, which is described in greater detail below. Connector 104 may also have an adaptation and/or regulator with over-voltage protection 110. Cable 100 has a cable section 101 with a coil section 105 that ends in a universal adaptor 102. This universal adaptor 102 may have the same number of pins as the USB connector, or it may have additional pins for purposes described below. Finally, there is a model-specific cell phone connector 103 that may contain additional circuitry 130, such as a voltage up-converter that some phones may require.

Figure 2:
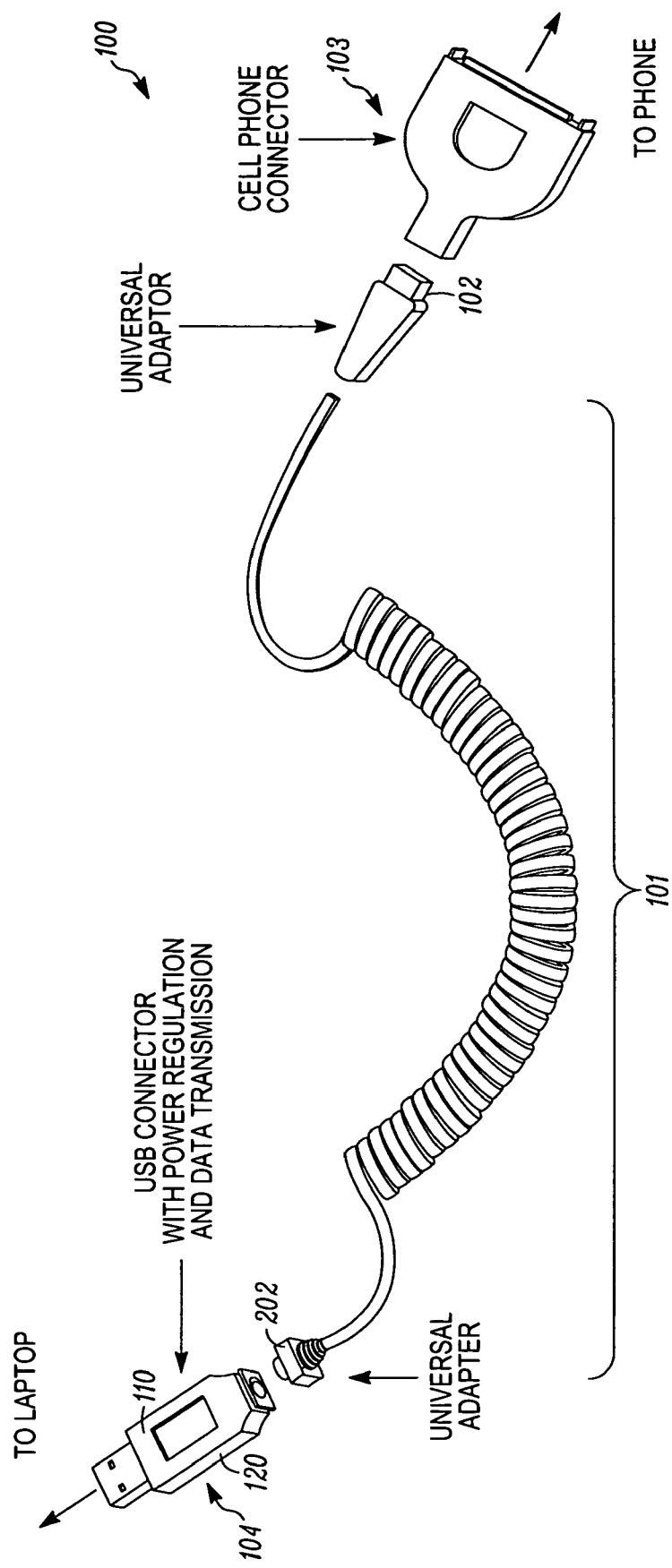
FIG. 2 shows an overview of a cable assembly 100 according to a second embodiment.

FIG. 2 shows an overview of a cable assembly 100 according to a second embodiment. FIG. 2 shows essentially the same cable assembly 100 as is shown in FIG. 1, but the USB connector now has a universal adaptor 202, in addition to the elements previously described in the discussion of FIG. 1. Adaptor 202 allows the cable section 101 to be completely detached from both intelligent connectors 104 and 103, thus offering greater flexibility of usage; for example, allowing the option of various cable lengths.

Figure 3:
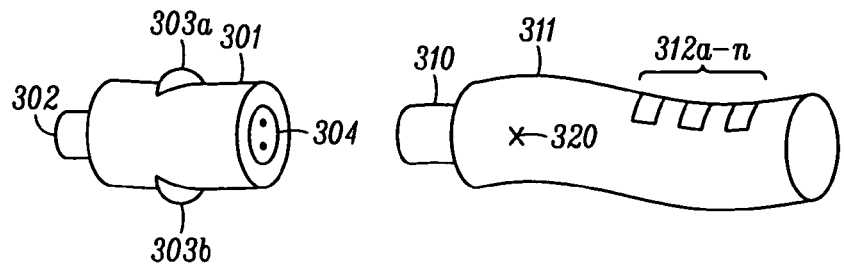
FIG. 3 shows an additional adaptor for use with a low voltage power source from a car or airplane, in accordance with one embodiment.

FIG. 3 shows an additional adaptor for use with a low voltage power source from a car or airplane. Section 301 is a car adaptor head with a central connecting pin 302 and peripheral springs 303a and 303b, which provide an airplane-like receptacle 304, where the airplane connector 311 may plug in with its airplane connector side 310. The airplane adaptor provides for multiple USB or universal connectors 312 a-n. Also, adaptor 311 may contain voltage conditioning and preparation circuitry 320 for down-transforming the voltage to the 5 volts typically provided by USB connectors such as 312 a-n. By connecting the two parts (car adaptor 301 and airplane connector 311), a "normal" car connector is created. There may be an additional latch or hook (not shown) to provide a better hold between the two sections and avoid accidental disconnect of the car adaptor section in a socket.

Figure 4:
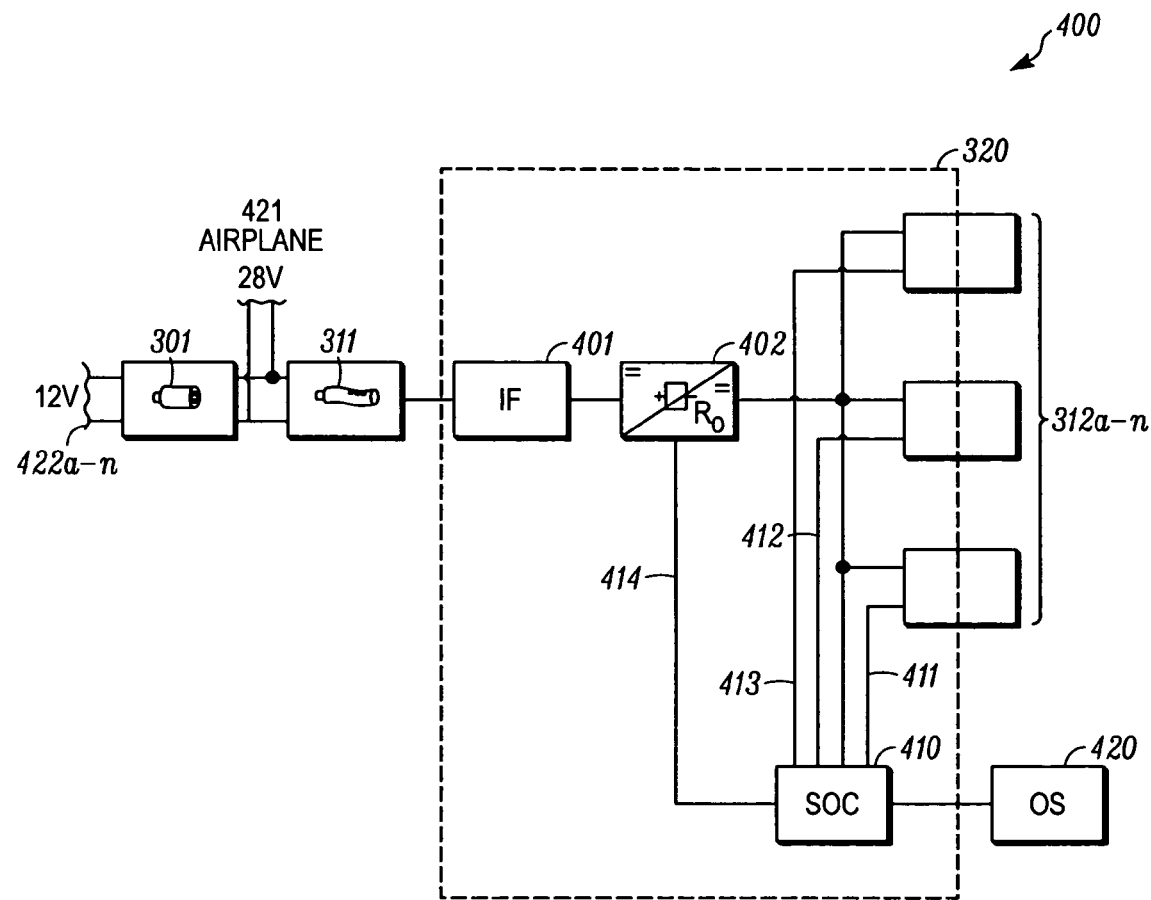
FIG. 4 shows circuitry 400 of parts of the cable assembly, in accordance with one embodiment.

FIG. 4 shows circuitry 400 of parts of the cable assembly, in accordance with one embodiment. One part is the circuitry 320 that could be contained in connector 311, and another part is the electrical schematics for adaptor section 301. Adaptor section 301 is mostly a mechanical adaptor. It is essentially a pass-through of the center low voltage (12-volt) pin of the car socket 422 to the positive pin of the airplane style socket at the other end, which would otherwise be the 28 volts that would come from an airplane socket at 421. Inside unit 311 there is, as mentioned previously, circuitry 320 that contains a voltage conditioner 401 that can filter the electrical input to eliminate spikes and protect from over-voltage and reverse polarity, etc. The dc-dc voltage regulator 402 is provided to prepare the voltage for the USB or universal connectors 312 a-n and supply those connectors 312a-n in bus form.

At the same time, in some cases a microcontroller or system on a chip 410 may be present. It has separate connections to each of the USB and/or universal connectors. In this example three are shown, but it is clear that there could be any number, from one to has high as five or even 10 or more. This system on a chip (SOC) could, for example, allow two devices that are charging simultaneously to exchange data as well by acting as a USB-on-the-go hub or as a dual-ported host to download data.

Different applications may be stored in system on a chip 410, as indicated by operating system software 420. In some cases, hooking up one of the USB connectors 312 a-n to a PC would allow updating or modification of the software 420. Also, in other cases, depending on the devices connected, the SOC may use line 414 to modify the voltages for one or all of the output connectors shown.

Figure 5:
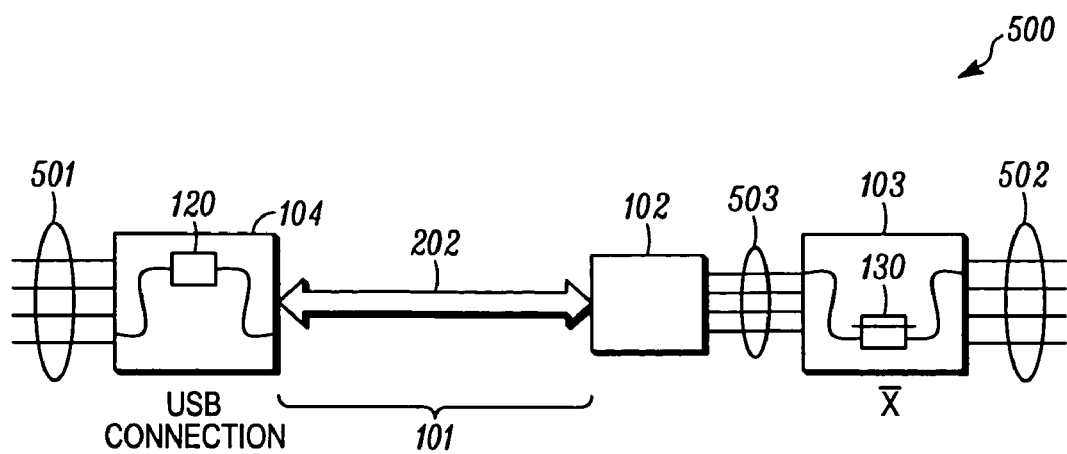
FIG. 5 illustrates an overview of the circuitry 500 of the cable assembly 100, in accordance with one embodiment.

FIG. 5 is an overview of the circuitry 500 of the cable assembly 100, as shown in FIG. 1. The USB connection 501 goes into connector 104 that contains the circuitry 120 and in some cases also contains universal adaptor 202. Cable assembly 100 also has, at the other end of cable 101, universal adaptor 102. There is also a connection 503 that may be the same as USB, or it may contain additional pins for various purposes. Adaptor piece 103 may also contain its own circuitry 130, and it will be, in most cases, just an elects mechanical adaptor, rewiring the data and power pins as required and delivering them as connector 502, which is typically specific to a phone or group of phones.

Figure 6:
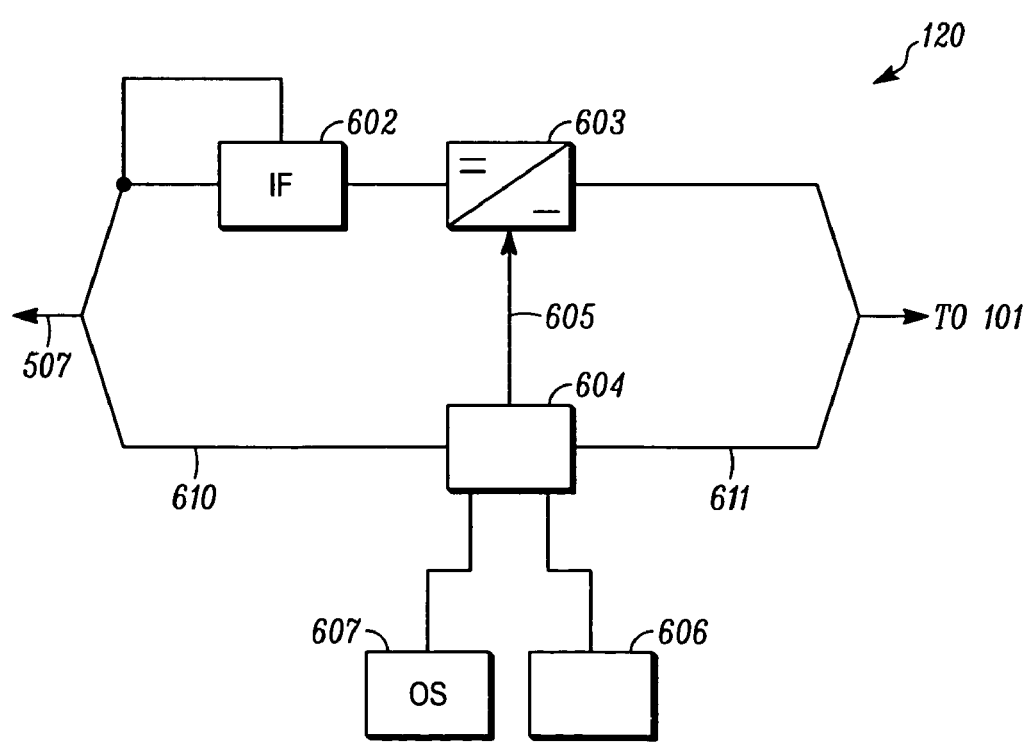
FIG. 6 shows the circuitry of USB connector and power regulator 120, in accordance with one embodiment.

FIG. 6 shows the circuitry of USB connector and power regulator 120, in accordance with one embodiment. The USB connection 501 enters and is split into a data path 610. The power goes into the input filter 602, from where it goes to a dc-dc converter 603 and is supplied to cable 101. At the other side, microprocessor 604 contains code that can also control the dc-dc converter via connection 605 and is able to talk both to a host computer through connection 610 and to the phone through connection 611. Typically, microprocessor 604 also has a nonvolatile memory 606 and an operating system 607. The operating system 607 may reside in said nonvolatile memory 606 or it may be masked, or it may be present in any combination. For example, certain phones may require a different voltage than the typical 4.2 or 4.5 volts, and after applying a low "safe" voltage, the processor 604 may communicate with the phone and detect the phone model. Processor 604 may then change the voltage of dc-dc converter 603 to match the voltage required for this phone model for optimal charging. Similar circuitry in connector 103 may be used to further condition the voltage or in some cases to up-convert to a higher voltage, because some phones require a voltage in the 6 to 9 voltage range, which is typically not supplied by the USB connector.

At least some embodiments, and the different structure and functional elements described herein, can be implemented using hardware, firmware, programs of instruction, or combinations of hardware, firmware, and programs of instructions.

In general, routines executed to implement the embodiments can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions can be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Some aspects can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

In various embodiments, hardwired circuitry can be used in combination with software instructions to implement the embodiments. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent can be reordered and other operations can be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications can be made thereto without departing from the broader spirit and scope of the invention as set forth in the following claims. The specification and drawings are, accordingly, to be regarded in an illustrative sense rather than a restrictive sense.

What is claimed is:

1. An apparatus comprising:
a cable assembly having a universal adapter at a first end of the assembly to connect with any one of a plurality of computing device connectors, each computing device connector corresponding to a separate computing device, and a second adapter at a second end of the assembly, the assembly further configured to provide power and data to a computing device via the universal adapter, the second adapter being configured to:
communicate with the computing device to detect a first voltage while providing power at a second voltage; and
adjust the second voltage to match the first voltage;
wherein the second adapter comprises an input filter and a DC-DC converter, connected to the input filter, the input filter configured to filter the power by eliminating spikes and protecting from over-voltage and reverse polarity, the DC-DC converter configured to receive the filtered power and generate the first voltage.

2. The apparatus of claim 1, wherein the computing devices include a mobile computing communication device.

3. The apparatus of claim 2, wherein the mobile computing communication device includes a cellular telephone.

4. The apparatus of claim 2, wherein the second adapter at the second end of the assembly includes a Universal Serial Bus (USB) adapter.

5. The apparatus of claim 2, wherein the second adapter at the second end of the assembly includes a universal adapter.

6. A cable assembly comprising:
a first adapter, at a first end of the assembly, configured to connect with a computing device connector corresponding to a separate computing device; and
a second adapter, at a second end of the assembly, configured to detect an optimal first voltage for the computing device while providing power at a second voltage and to adjust the second voltage to match the first voltage;
wherein the second adapter comprises an input filter and a DC-DC converter, connected to the input filter, the input filter configured to filter the power by eliminating spikes and protecting from over-voltage and reverse polarity, the DC-DC converter configured to receive the filtered power and generate the first voltage.

7. The apparatus of claim 1, wherein the second adapter comprises a processor, the processor being configured to receive the power.

8. The apparatus of claim 7, wherein the processor is configured to control the DC-DC converter.

9. The apparatus of claim 8, wherein the processor is to interface with a host computer via the second adapter and with the computing devices via the universal adapter at the first end of the assembly.

10. The apparatus of claim 9, the processor to interface with the computing devices to determine a voltage to be used by the DC-DC converter.

11. The apparatus of claim 1, wherein the second adapter includes multiple universal connectors.

12. The apparatus of claim 1, wherein the second adapter includes multiple Universal Serial Bus (USB) connectors.

13. The apparatus of claim 12, wherein the cable assembly further includes a mechanical adapter.

14. The apparatus of claim 13, wherein the mechanical adapter is configured to be inserted into a power adapter of an automobile.

15. The apparatus of claim 11, wherein the second adapter further comprises voltage conditioning and preparation circuitry to down-transform voltage.

16. The apparatus of claim 11, wherein the second adapter further comprises a processor having a separate connection to the plurality of connectors, the processor being configured to facilitate data exchange between separate devices connected to the multiple connectors, when the separate devices are charging simultaneously.

17. The assembly of claim 6, wherein the computing device includes a mobile computing communication device.

18. The assembly of claim 6, wherein the first voltage is within the operating voltage range of the computing device.

19. The apparatus of claim 1, wherein the first voltage is within the operating voltage range of the computing device.

20. The apparatus of claim 1, wherein the second voltage is at a safe voltage for the computing device to communicate with the second adapter.

21. The assembly of claim 6, wherein the second adapter at the second end of the assembly includes a Universal Serial Bus (USB) adapter.

22. The assembly of claim 6, wherein the second adapter at the second end of the assembly includes a universal adapter.

23. The assembly of claim 6, wherein the second adapter includes multiple universal connectors.

24. The assembly of claim 6, wherein the second adapter includes multiple Universal Serial Bus (USB) connectors.

25. A method comprising:
connecting, via a first adapter, with a computing device connector corresponding to a separate computing device;
detecting, via a second adapter, an optimal first voltage for the computing device;
providing, via the second adapter, power at a second voltage; and
adjusting, via the second adapter, the second voltage to match the first voltage;
wherein the second adapter comprises an input filter and a DC-DC converter, connected to the input filter, the input filter configured to filter the power by eliminating spikes and protecting from over-voltage and reverse polarity, the DC-DC converter configured to receive the filtered power and generate the first voltage.

* * * * *